(12) United States Patent
Yin (10) Patent No.: US 10,760,625 B2
(45) Date of Patent: Sep. 1, 2020

(54) DOUBLE-RATCHET TYPE ONE-WAY CLUTCH

(71) Applicant: Shihe Yin, Guangzhou (CN)

(72) Inventor: Shihe Yin, Guangzhou (CN)

(*) Notice: Subject to any disclaimer, the term of this patent is extended or adjusted under 35 U.S.C. 154(b) by 0 days.

(21) Appl. No.: 16/396,702

(22) Filed: Apr. 28, 2019

(65) Prior Publication Data

US 2019/0249726 A1 Aug. 15, 2019

Related U.S. Application Data

(63) Continuation of application No. PCT/CN2017/107231, filed on Oct. 23, 2017.

(51) Int. Cl.
*F16D 41/12* (2006.01)
*F16D 41/064* (2006.01)

(52) U.S. Cl.
CPC ........... *F16D 41/12* (2013.01); *F16D 41/064* (2013.01)

(58) Field of Classification Search
CPC .............................. F16D 41/12; F16D 41/064
See application file for complete search history.

(56) References Cited

U.S. PATENT DOCUMENTS

| | | | |
|---|---|---|---|
| 8,376,897 B2* | 2/2013 | Shoge | ................ B60B 27/0005 475/284 |
| 10,024,370 B1* | 7/2018 | Klaser | .................. F16D 27/102 |

| | | | |
|---|---|---|---|
| 2011/0290608 A1 | 12/2011 | Bird et al. | |
| 2016/0091062 A1* | 3/2016 | Wys | ......................... F16H 3/44 475/5 |
| 2018/0347644 A1* | 12/2018 | Brezger | ................. F16D 41/12 |

FOREIGN PATENT DOCUMENTS

| | | |
|---|---|---|
| CN | 102086909 A | 6/2011 |
| CN | 204572849 A | 8/2015 |
| CN | 105805185 A | 7/2016 |
| CN | 106855087 A | 6/2017 |
| CN | 206429574 A | 8/2017 |
| DE | 202015003525 A | 8/2015 |
| JP | 2007255605 A | 10/2007 |

OTHER PUBLICATIONS

International search report of PCT/CN2017/107231.

* cited by examiner

*Primary Examiner* — David J Hlavka
(74) *Attorney, Agent, or Firm* — Andrew C. Cheng (57) ABSTRACT

A double-ratchet type one-way clutch, in which pawls do not knock the surfaces of ratchets when the double-ratchet type one-way clutch rotates in an idling direction, mainly comprises: a driving ratchet, a driven ratchet set, a pawl set, and rolling bearings. The pawl set comprises: a pawl base cover, a plurality of pawls, and a plurality of elastic elements. The driven ratchet set comprises: a ratchet of the driven ratchet set, balls, a ball cage, and a driven ratchet set supporting ring. When the double-ratchet type one-way clutch rotates in the idling direction, the driving ratchet firstly rotates relative to the ratchet of the driven ratchet set. After a top tooth surface of the ratchet of the driven ratchet set and a top tooth surface of the driving ratchet are complementary in an axial direction, the driving ratchet drives the ratchet of the driven ratchet set to rotate together.

1 Claim, 11 Drawing Sheets

DOUBLE-RATCHET TYPE ONE-WAY CLUTCH

CROSS-REFERENCE TO RELATED APPLICATIONS

This application is a continuation of International Patent Application No. PCT/CN2017/107231 with a filing date of Oct. 23, 2017, designating the United States, now pending, and further claims priority to Chinese Patent Application No. 201611074925.6 with a filing date of Nov. 30, 2016, and Chinese Patent Application No. 201621294458.3 with a filing date of Nov. 30, 2016. The content of the aforementioned applications, including any intervening amendments thereto, are incorporated herein by reference.

TECHNICAL FIELD

The disclosure relates to a one-way clutch, and in particular to a double-ratchet type one-way clutch.

BACKGROUND OF THE PRESENT INVENTION

The ratchet clutch is one of one-way clutches, and can be divided into two types: an external engagement ratchet clutch and an internal engagement ratchet clutch. The traditional ratchet clutch realizes the function of transferring a torque in one rotating direction and idling in another direction through a mechanism composed of one ratchet and a plurality of pawls. When the ratchet type one-way clutch rotates in the idling direction, the pawls slide over a top tooth surface of the ratchet, so that an outer ring and an inner ring idle relatively. When the ratchet type one-way clutch rotates in a locking direction, the pawls and a tooth slot of the ratchet are embedded, and the one-way clutch becomes locked so as to transfer the torque between the inner ring and the outer ring.

In the ratchet type one-way clutch with traditional structure, when the one-way clutch rotates in the idling direction, the pawls slide over the tail end of the top tooth surface of the ratchet and knock the surface of the ratchet under the effect of an elastic element, and make a sound. Then, the pawls continue to slide to the top tooth surface of the next ratchet and continue to slide over the tail end of the top tooth surface of the next ratchet. Therefore, when the ratchet type one-way clutch rotates in the idling direction, the pawls will continuously knock the surface of the ratchet and make a sound, and the elastic element will continuously expand and contract and generate energy loss. This process will increase the wear of the pawls and the ratchet and reduce the service life of the elastic element.

SUMMARY OF PRESENT INVENTION

The disclosure proposes a double-ratchet type one-way clutch, and can be divided into two embodiments of external engagement and internal engagement. The pawls will not knock the surface of the ratchet when the double-ratchet type one-way clutch rotates in the idling direction.

To achieve the above purpose, the technical solution of the disclosure is as follows:

A double-ratchet type one-way clutch mainly includes:

a driving ratchet, wherein when the embodiment of the double-ratchet type one-way clutch is external engagement, the driving ratchet is an external-tooth ratchet as an inner ring of the one-way clutch, and when the embodiment of the double-ratchet type one-way clutch is internal engagement, the driving ratchet is an internal-tooth ratchet as an outer ring of the one-way clutch; and the driving ratchet is provided with one or more locating slots;

a pawl set including a pawl base cover, a plurality of pawls, and a plurality of elastic elements, wherein the plurality of pawls are installed on the pawl base cover and the plurality of elastic elements are respectively clamped between the pawl base cover and each of the pawls; when the embodiment of the double-ratchet type one-way clutch is external engagement, the pawl base cover is used as an outer ring of the one-way clutch, and when the embodiment of the double-ratchet type one-way clutch is internal engagement, the pawl base cover is used as an inner ring of the one-way clutch;

a driven ratchet set including a ratchet of the driven ratchet set, balls, a ball cage, and a driven ratchet set supporting ring, wherein when the embodiment of the double-ratchet type one-way clutch is external engagement, the ratchet of the driven ratchet set is an external-tooth ratchet, and when the embodiment of the double-ratchet type one-way clutch is internal engagement, the ratchet of the driven ratchet set is an internal-tooth ratchet; the ratchet of the driven ratchet set is provided with one or more locating pins; and the driven ratchet set is installed on the pawl base cover in the pawl set; and two groups of rolling bearings used for connecting and supporting the driving ratchet and the pawl base cover in the pawl set.

The disclosure has the following beneficial effects: when the double-ratchet type one-way clutch rotates in an idling direction, the driving ratchet firstly rotates relative to the ratchet of the driven ratchet set; and after a top tooth surface of the ratchet of the driven ratchet set and a top tooth surface of the driving ratchet are complementary in an axial direction, the driving ratchet drives the ratchet of the driven ratchet set to rotate together, so that the pawls slide over the tail end of the top tooth surface of the driving ratchet and then reach the top tooth surface of the ratchet of the driven ratchet set, thereby preventing the pawls from knocking the driving ratchet.

List of reference numerals: 1—driving ratchet; 2—ratchet of driven ratchet set; 3—pawl; 4—elastic element; 5—pawl base cover, 6—ball; 7—ball cage; 8—driven ratchet set supporting ring; 10—rolling bearing; 11—rolling bearing; 12—shaft circlip; 13—hole circlip; 14—shaft circlip; 15—hole circlip; 20—locating slot; 21—locating pin; 51—driving ratchet; 52—ratchet of driven ratchet set; 53—pawl; 54—elastic element; 55—pawl base cover, 56—ball; 57—ball cage; 58—driven ratchet set supporting ring; 60—rolling bearing; 61—rolling bearing; 62—shaft circlip; 63—hole circlip; 64—shaft circlip; 65—hole circlip; 70—locating slot; and 71—locating pin.

DETAILED DESCRIPTION OF PREFERRED EMBODIMENTS

Various embodiments of the disclosure are described below in detail in combination with the drawings.

Figure 1:
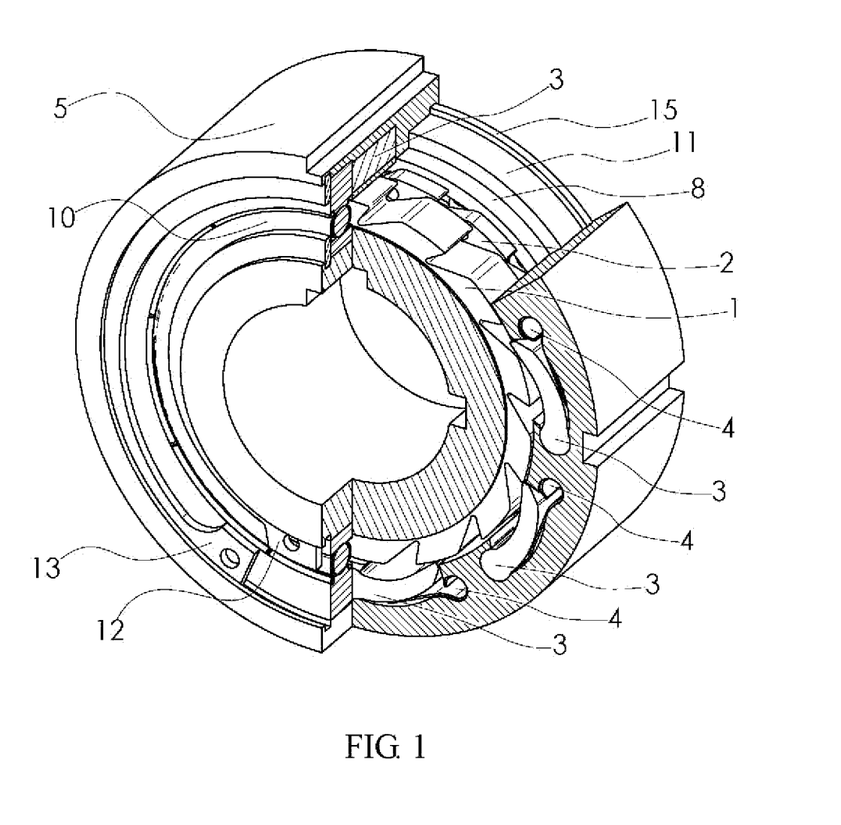
FIG. 1 is a sectional axonometric drawing of a double-ratchet type one-way clutch with an external engagement according to the disclosure.

FIG. 1 shows a double-ratchet type one-way clutch with an external engagement according to the disclosure. The driving ratchet 1 is used as the inner ring of the one-way clutch, and the pawl base cover 5 is used as the outer ring of the one-way clutch. The pawls 3 are installed on the pawl base cover 5. The elastic elements 4 are clamped between the pawls 3 and the pawl base cover 5. A plurality of pawls 3, a plurality of elastic elements 4 and the pawl base cover 5 jointly form a pawl set.

Figure 2:
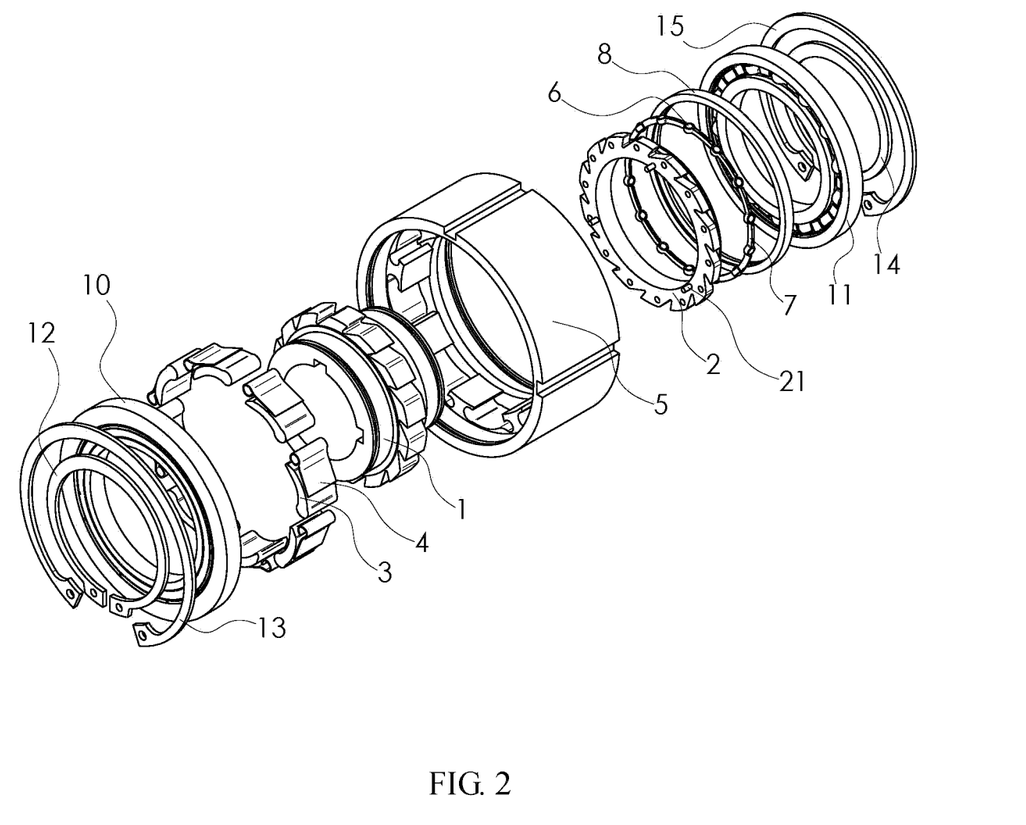
FIG. 2 is an exploded axonometric drawing of a double-ratchet type one-way clutch with an external engagement according to the disclosure.
Figure 3:
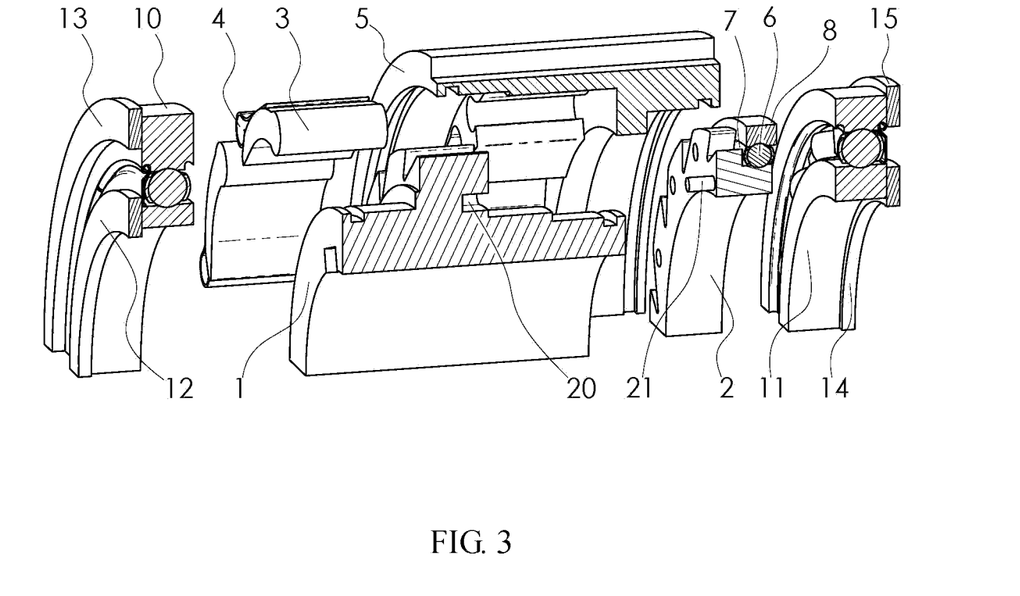
FIG. 3 is an exploded axonometric drawing of a cross section of a diameter plane part of a double-ratchet type one-way clutch with an external engagement according to the disclosure.
Figure 4:
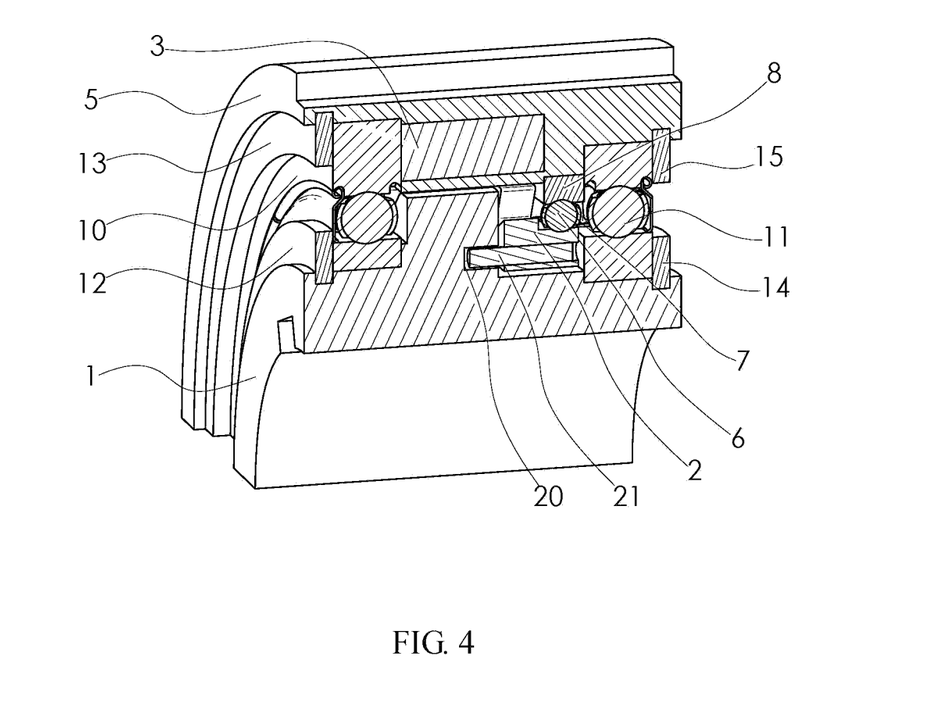
FIG. 4 is an axonometric drawing of a cross section of a diameter plane part of a double-ratchet type one-way clutch with an external engagement according to the disclosure.

FIGS. 2-4 show a double-ratchet type one-way clutch with an external engagement according to the disclosure. A driven ratchet set composed of a ratchet 2 of the driven ratchet set, balls 6, a ball cage 7 and a driven ratchet set supporting ring 8 is installed on the pawl base cover 5 in the pawl set. The driving ratchet 1 and the pawl base cover 5 are assembled and connected through a rolling bearing 10 and a rolling bearing 11. The positions of the rolling bearing 10 and the rolling bearing 11 are fixed through a shaft circlip 12, a hole circlip 13, a shaft circlip 14 and a hole circlip 15.

FIG. 4 shows a double-ratchet type one-way clutch with an external engagement according to the disclosure. Both end surfaces of the ratchet 2 of the driven ratchet set are not in contact with the driving ratchet 1 and the rolling bearing 11 respectively. An inner hole of the ratchet 2 of the driven ratchet set is not in contact with the driving ratchet 1. One end of a locating pin 21 is fixed to the ratchet 2 of the driven ratchet set, and one end extends into a locating slot 20 of the driving ratchet 1. The width of the locating slot 20 is larger than the diameter of the locating pin 21.

Figure 5:
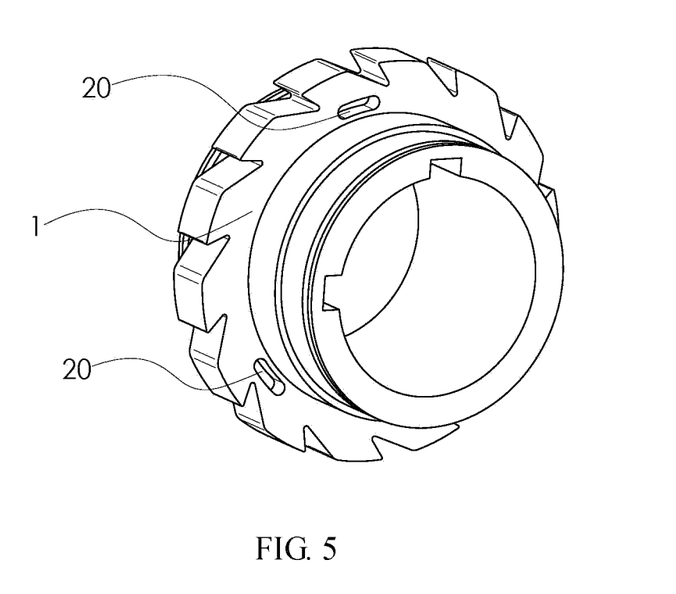
FIG. 5 is an axonometric drawing of a back direction of a driving ratchet of a double-ratchet type one-way clutch with an external engagement according to the disclosure.
Figure 6:
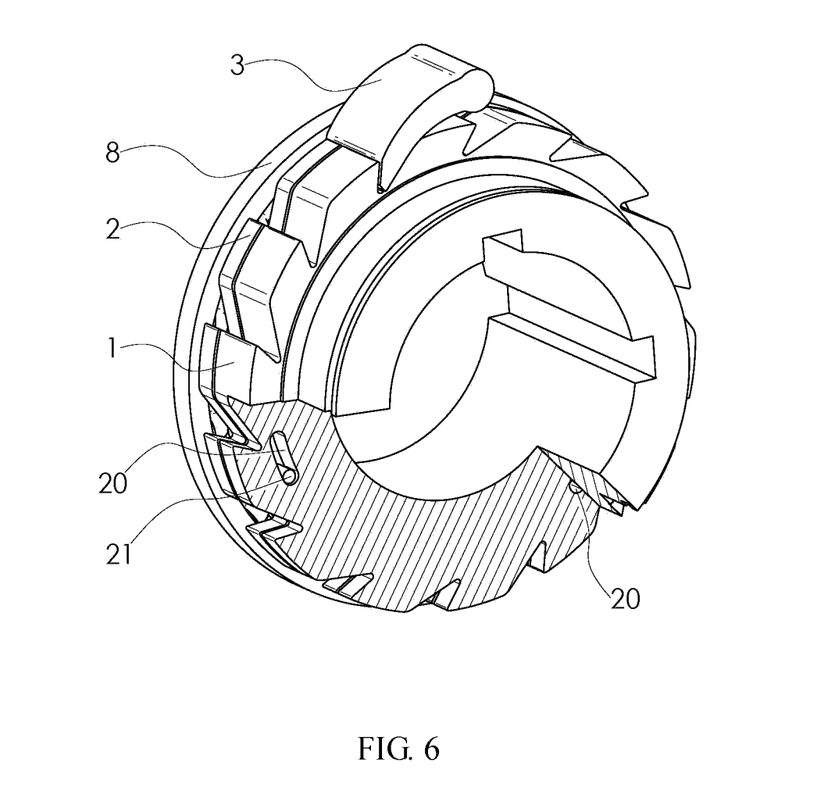
FIG. 6 is a partial sectional schematic diagram of a relative position relationship of a driving ratchet, a driven ratchet set and pawls during rotation in a locking direction in a double-ratchet type one-way clutch with an external engagement according to the disclosure.
Figure 7:
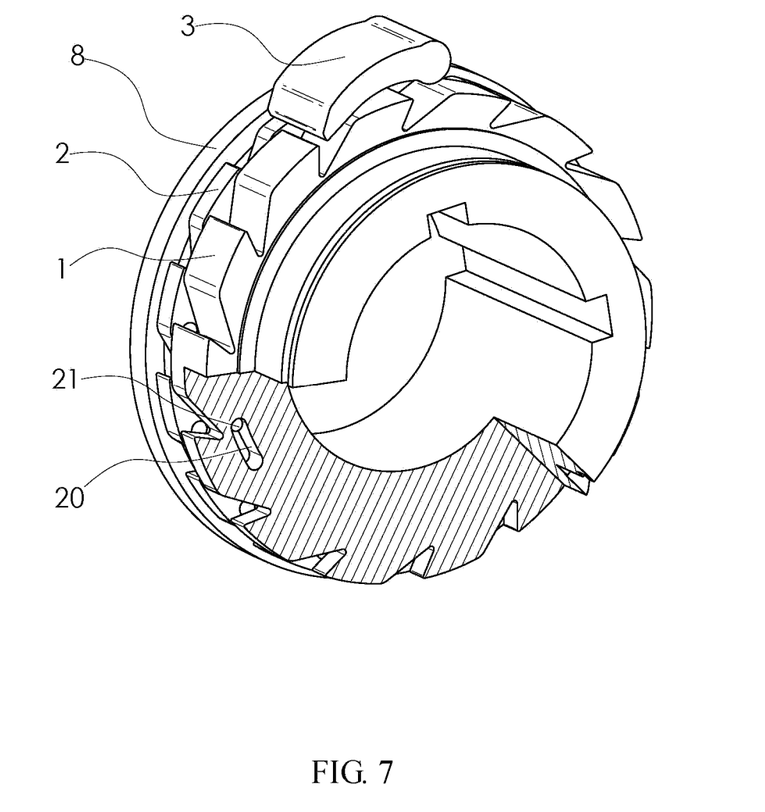
FIG. 7 is a partial sectional schematic diagram of a relative position relationship of a driving ratchet, a driven ratchet set and pawls during rotation in an idling direction in a double-ratchet type one-way clutch with an external engagement according to the disclosure.

FIGS. 5-7 show a double-ratchet type one-way clutch with an external engagement according to the disclosure. One end of the locating pin 21 is fixed to the ratchet 2 of the driven ratchet set, and one end extends into the locating slot 20 of the driving ratchet 1; and the width of the locating slot 20 is larger than the diameter of the locating pin 21. Therefore, the driving ratchet 1 and the ratchet 2 of the driven ratchet set can rotate relative to each other. The angle of rotation is determined by the length of the locating slot 20. The driving ratchet 1 controls its relative position with the ratchet 2 of the driven ratchet set through the locating slot 20, and drives the ratchet 2 of the driven ratchet set to rotate.

FIG. 6 shows a double-ratchet type one-way clutch with an external engagement according to the disclosure. When the double-ratchet type one-way clutch in the external engagement embodiment rotates in a locking direction, the driving ratchet 1 firstly rotates relative to the ratchet 2 of the driven ratchet set. After ratchet teeth of the ratchet 2 of the driven ratchet set and ratchet teeth of the driving ratchet 1 are axially overlapped, the driving ratchet 1 drives the ratchet 2 of the driven ratchet set to rotate together under the effect of the locating slot 20. At this moment, the pawls 3 can be embedded with tooth slots of the driving ratchet 1 and the ratchet 2 of the driven ratchet set.

FIG. 7 shows a double-ratchet type one-way clutch with an external engagement according to the disclosure. When the double-ratchet type one-way clutch in the external engagement embodiment rotates in an idling direction, the driving ratchet 1 firstly rotates relative to the ratchet 2 of the driven ratchet set. After a top tooth surface of the ratchet 2 of the driven ratchet set and a top tooth surface of the driving ratchet 1 are complementary in an axial direction, the driving ratchet 1 drives the ratchet 2 of the driven ratchet set to rotate together through the locating slot 20. At this moment, the pawls 3 can continuously slide over the top tooth surface of the driving ratchet 1 and the top tooth surface of the ratchet 2 of the driven ratchet set.

Figure 8:
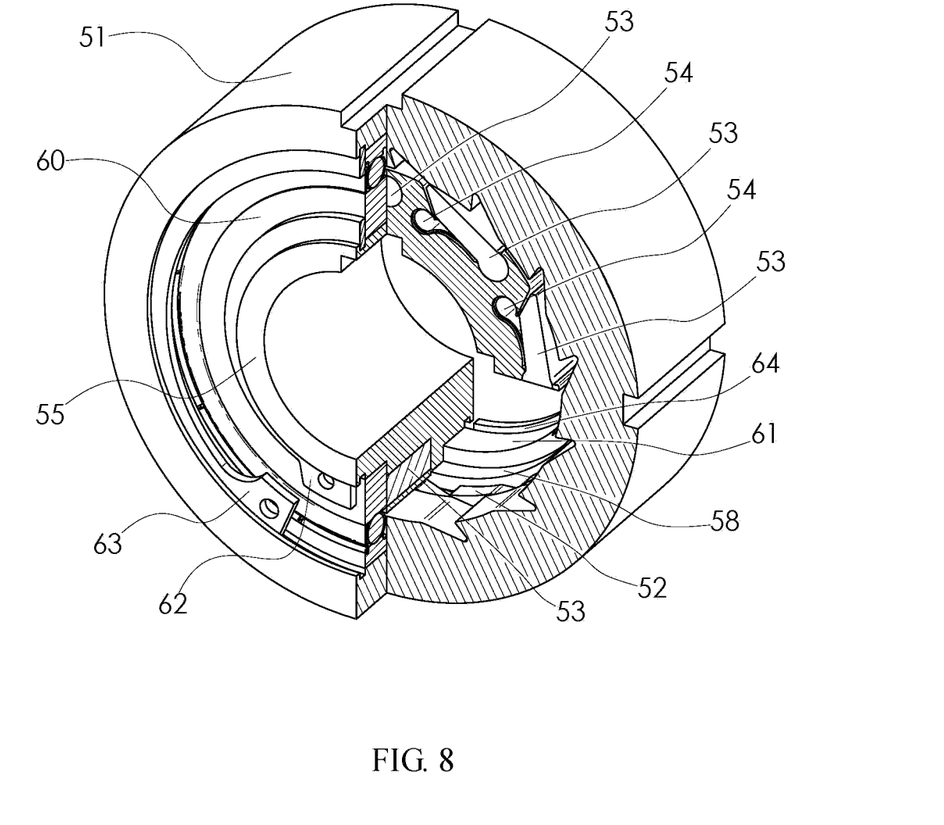
FIG. 8 is a sectional axonometric drawing of a double-ratchet type one-way clutch with an internal engagement according to the disclosure.

FIG. 8 shows an internal engagement embodiment of a double-ratchet type one-way clutch according to the disclosure. The driving ratchet 51 is used as the outer ring of the one-way clutch, and the pawl base cover 55 is used as the inner ring of the one-way clutch. The pawls 53 are installed on the pawl base cover 55. The elastic elements 54 are clamped between the pawls 53 and the pawl base cover 55. A plurality of pawls 53, a plurality of elastic elements 54 and the pawl base cover 55 jointly form a pawl set.

Figure 9:
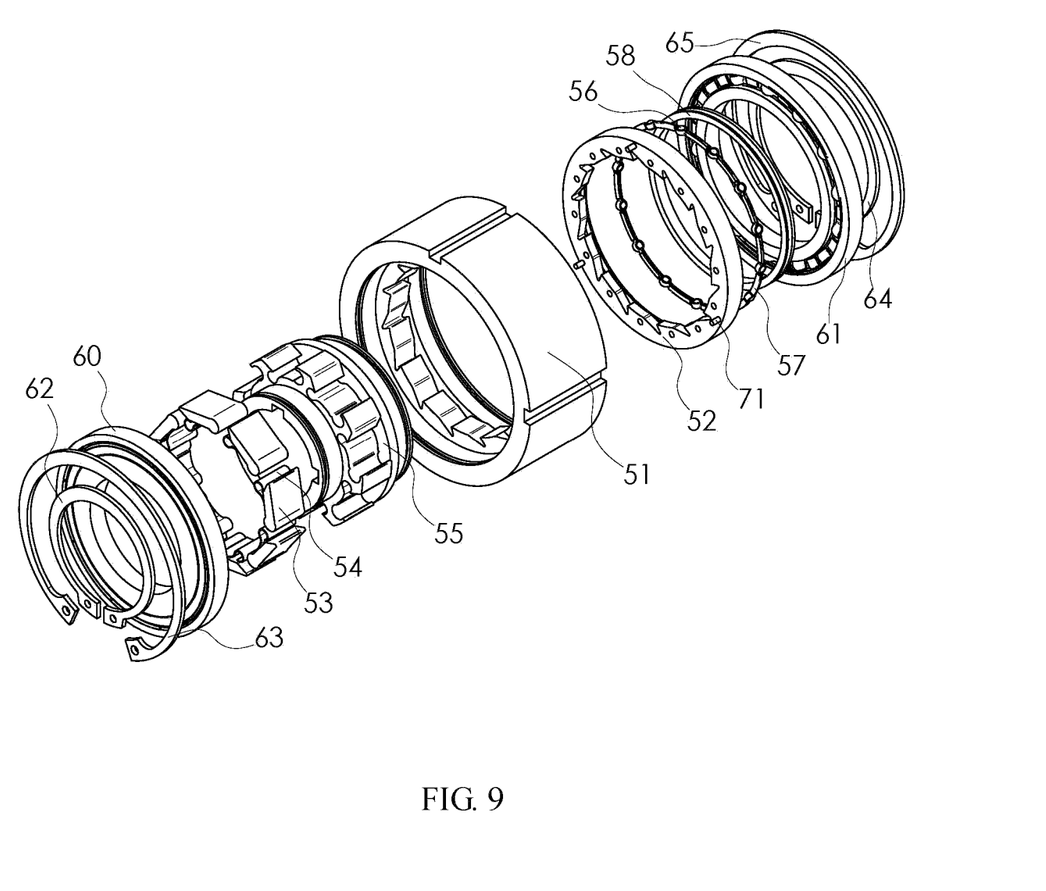
FIG. 9 is an exploded axonometric drawing of a double-ratchet type one-way clutch with an internal engagement according to the disclosure.
Figure 10:
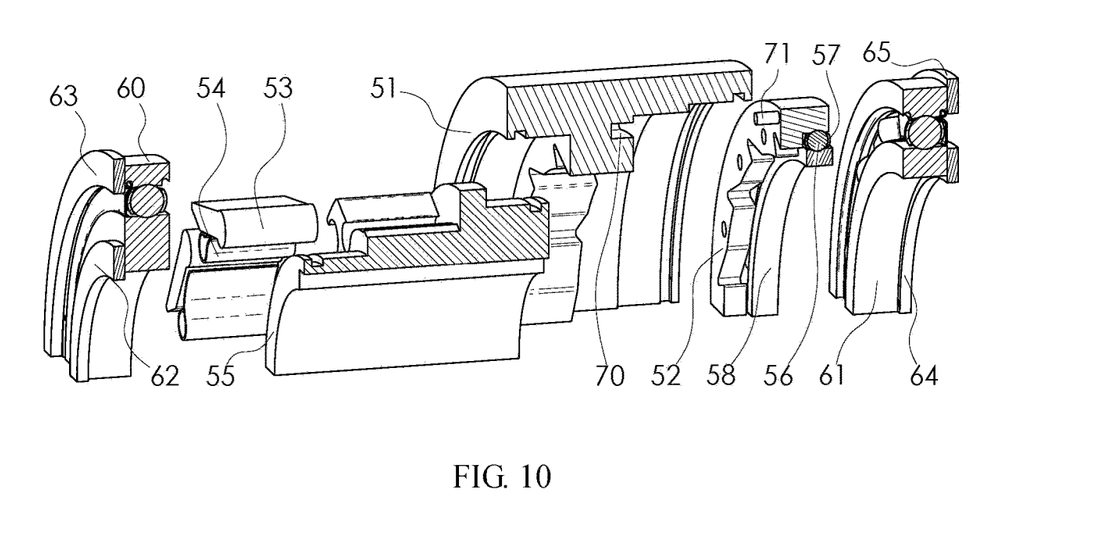
FIG. 10 is an exploded axonometric drawing of a cross section of a diameter plane part of a double-ratchet type one-way clutch with an internal engagement according to the disclosure.
Figure 11:
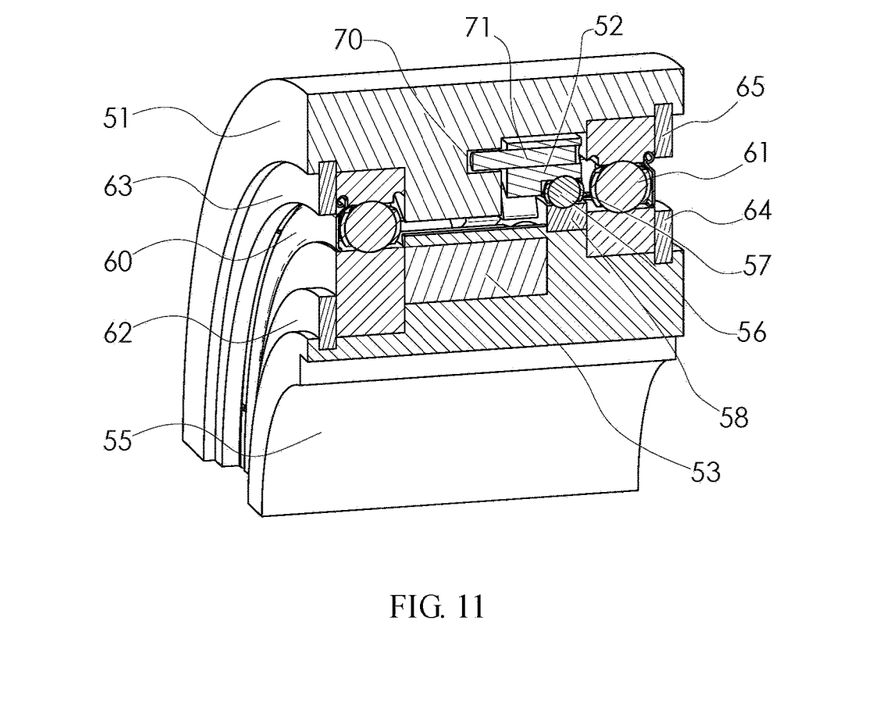
FIG. 11 is an axonometric drawing of a cross section of a diameter plane part of a double-ratchet type one-way clutch with an internal engagement according to the disclosure.

FIGS. 9-11 show an internal engagement embodiment of a double-ratchet type one-way clutch according to the disclosure. A driven ratchet set composed of a ratchet 52 of the driven ratchet set, balls 56, a ball cage 57 and a driven ratchet set supporting ring 58 is installed on the pawl base cover 55 in the pawl set. The driving ratchet 51 and the pawl base cover 55 are assembled and connected through a rolling bearing 60 and a rolling bearing 61. The positions of the rolling bearing 60 and the rolling bearing 61 are fixed through a shaft circlip 62, a hole circlip 63, a shaft circlip 64 and a hole circlip 65.

FIG. 11 shows an internal engagement embodiment of a double-ratchet type one-way clutch according to the disclosure. Both end surfaces of the ratchet 52 of the driven ratchet set are not in contact with the driving ratchet 51 and the rolling bearing 61 respectively. An inner hole of the ratchet 52 of the driven ratchet set is not in contact with the driving ratchet 51. One end of a locating pin 71 is fixed to the ratchet 52 of the driven ratchet set, and one end extends into a locating slot 70 of the driving ratchet 51. The width of the locating slot 70 is larger than the diameter of the locating pin 71.

Figure 12:
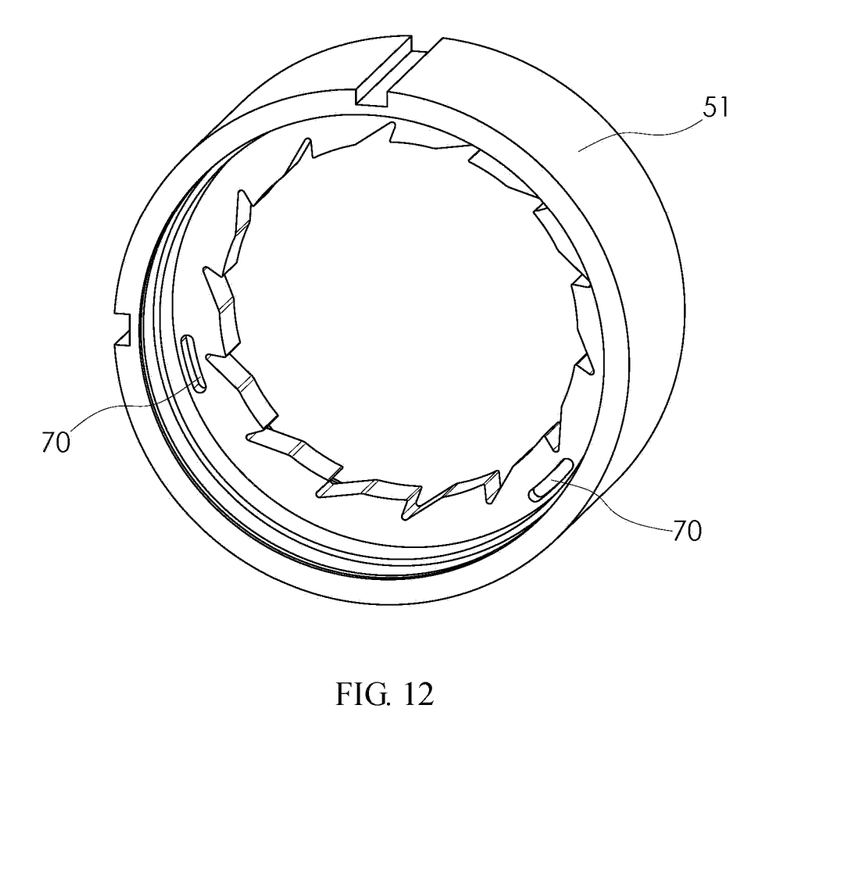
FIG. 12 is an axonometric drawing of a back direction of a driving ratchet of a double-ratchet type one-way clutch with an internal engagement according to the disclosure.
Figure 13:
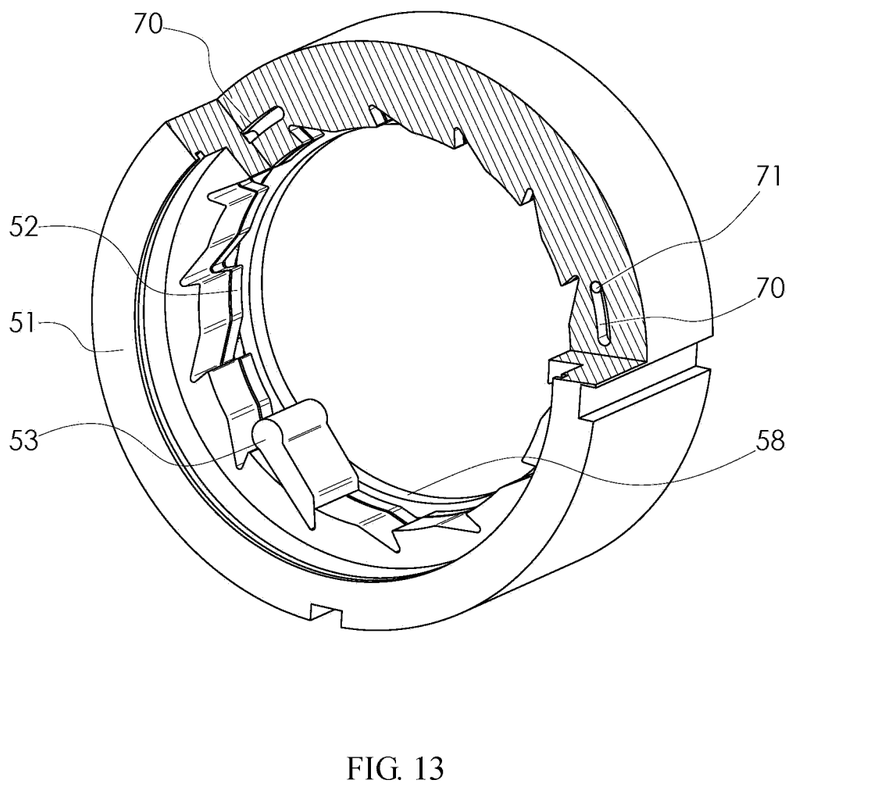
FIG. 13 is a partial sectional schematic diagram of a relative position relationship of a driving ratchet, a driven ratchet set and pawls during rotation in a locking direction in a double-ratchet type one-way clutch with an internal engagement according to the disclosure.
Figure 14:
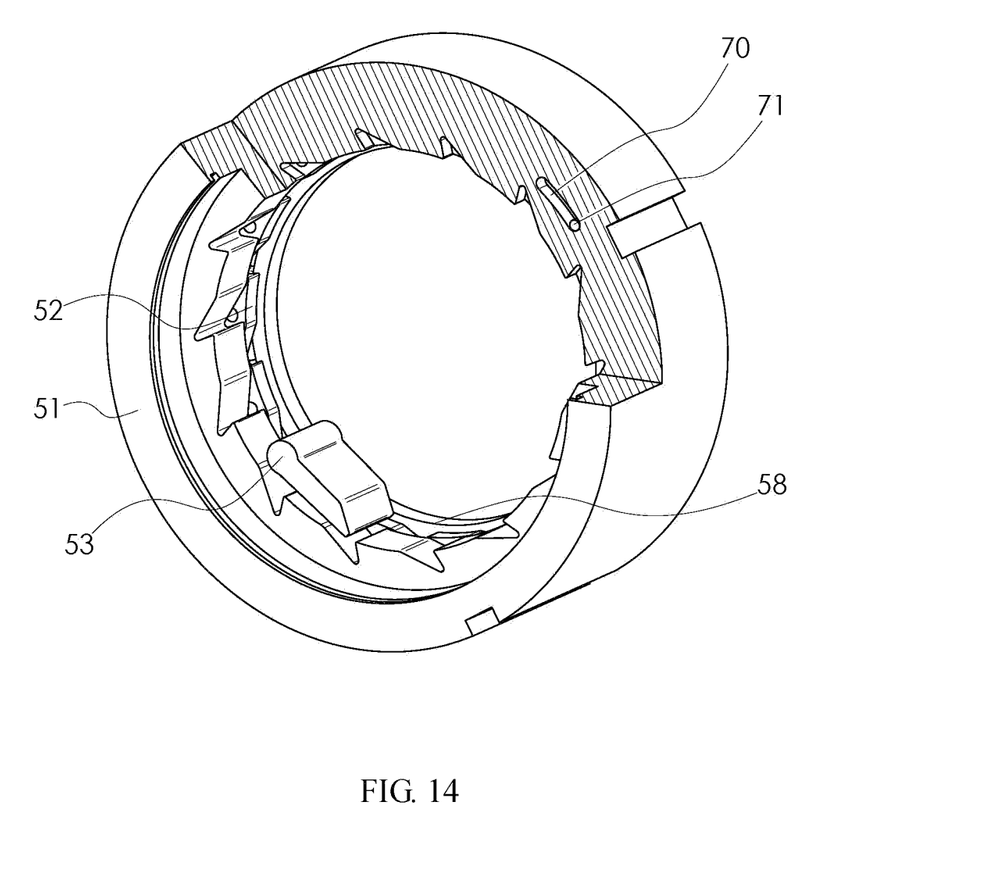
FIG. 14 is a partial sectional schematic diagram of a relative position relationship of a driving ratchet, a driven ratchet set and pawls during rotation in an idling direction in a double-ratchet type one-way clutch with an internal engagement according to the disclosure.

FIGS. 12-14 show an internal engagement embodiment of a double-ratchet type one-way clutch according to the disclosure. One end of the locating pin 71 is fixed to the ratchet 52 of the driven ratchet set, and one end extends into the locating slot 70 of the driving ratchet 51; and the width of the locating slot 70 is larger than the diameter of the locating pin 71. Therefore, the driving ratchet 51 and the ratchet 52 of the driven ratchet set can rotate relative to each other. The angle of rotation is determined by the length of the locating slot 70. The driving ratchet 51 controls its relative position with the ratchet 52 of the driven ratchet set through the locating slot 70, and drives the ratchet 52 of the driven ratchet set to rotate.

FIG. 13 shows an internal engagement embodiment of a double-ratchet type one-way clutch according to the disclosure. When the double-ratchet type one-way clutch in the internal engagement embodiment rotates in a locking direction, the driving ratchet 51 firstly rotates relative to the ratchet 52 of the driven ratchet set. After ratchet teeth of the ratchet 52 of the driven ratchet set and ratchet teeth of the driving ratchet 51 are axially overlapped, the driving ratchet 51 drives the ratchet 52 of the driven ratchet set to rotate together under the effect of the locating slot 70. At this moment, the pawls 53 can be embedded with tooth slots of the driving ratchet 51 and the ratchet 52 of the driven ratchet set.

FIG. 14 shows an internal engagement embodiment of a double-ratchet type one-way clutch according to the disclosure. When the double-ratchet type one-way clutch in the internal engagement embodiment rotates in an idling direction, the driving ratchet 51 firstly rotates relative to the ratchet 52 of the driven ratchet set. After a top tooth surface of the ratchet 52 of the driven ratchet set and a top tooth surface of the driving ratchet 51 are complementary in an axial direction, the driving ratchet 51 drives the ratchet 52 of the driven ratchet set to rotate together through the locating slot 70. At this moment, the pawls 53 can continuously slide over the top tooth surface of the driving ratchet 51 and the top tooth surface of the ratchet 52 of the driven ratchet set.

I claim:

1. A double-ratchet type one-way clutch, comprising:
   a driving ratchet provided with one or more locating slots;
   a pawl set comprising a pawl base cover, a plurality of pawls, and a plurality of elastic elements, wherein the plurality of pawls are installed on the pawl base cover and the plurality of elastic elements are respectively clamped between the pawl base cover and each of the pawls;
   a driven ratchet set comprising a ratchet of the driven ratchet set, balls, a ball cage, and a driven ratchet set supporting ring, wherein the ratchet of the driven ratchet set is provided with one or more locating pins and the driven ratchet set is installed on the pawl base cover in the pawl set; and
   two groups of rolling bearings used for connecting and supporting the driving ratchet and the pawl base cover in the pawl set, wherein
   when the double-ratchet type one-way clutch rotates in an idling direction, the driving ratchet firstly rotates relative to the ratchet of the driven ratchet set; and after a top tooth surface of the ratchet of the driven ratchet set and a top tooth surface of the driving ratchet are complementary in an axial direction, the driving ratchet drives the ratchet of the driven ratchet set to rotate together, so that the pawls slide over a tail end of the top tooth surface of the driving ratchet and then reach the top tooth surface of the ratchet of the driven ratchet set.

* * * * *